(12) United States Patent
Suzuki et al.

(10) Patent No.: US 8,875,907 B2
(45) Date of Patent: Nov. 4, 2014

(54) STORAGE CELL AND MAGAZINE

(75) Inventors: Takeshi Suzuki, Tokyo (JP); Shinichi Iwata, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 745 days.

(21) Appl. No.: 12/678,797

(22) PCT Filed: Sep. 22, 2008

(86) PCT No.: PCT/JP2008/067055
§ 371 (c)(1),
(2), (4) Date: Mar. 18, 2010

(87) PCT Pub. No.: WO2009/041375
PCT Pub. Date: Apr. 2, 2009

(65) Prior Publication Data
US 2010/0200524 A1   Aug. 12, 2010

(30) Foreign Application Priority Data
Sep. 28, 2007 (JP) ................................. 2007-254051

(51) Int. Cl.
*A47F 7/00* (2006.01)
*G11B 15/68* (2006.01)
*G11B 17/22* (2006.01)

(52) U.S. Cl.
CPC ........ *G11B 15/6885* (2013.01); *G11B 15/6835* (2013.01); *G11B 17/225* (2013.01)
USPC .......................... 211/26; 211/41.12; 211/59.2

(58) Field of Classification Search
USPC ..................... 360/92.1; 221/279; 206/387.12; 312/333, 9.22, 9.63; 211/59.2, 59.3, 211/41.12, 40, 26
See application file for complete search history.

(56) References Cited

U.S. PATENT DOCUMENTS

| 3,561,004 | A | * | 2/1971 | Kozu et al. ...................... 221/86 |
| 3,926,310 | A | * | 12/1975 | Ackeret .................. 206/387.12 |
| 4,030,601 | A | * | 6/1977 | Ackeret .................. 206/387.12 |
| 5,345,350 | A | | 9/1994 | Ellis et al. |
| 5,367,415 | A | | 11/1994 | Todd |
| 5,508,859 | A | | 4/1996 | Hu et al. |
| 5,666,337 | A | | 9/1997 | Dang et al. |
| 6,781,789 | B2 | | 8/2004 | Ostwald |
| 6,909,577 | B2 | | 6/2005 | Luffel |
| 7,477,478 | B2 | * | 1/2009 | Nave et al. .................. 360/92.1 |
| 7,480,118 | B2 | | 1/2009 | Ojima et al. |

(Continued)

FOREIGN PATENT DOCUMENTS

| EP | 1369873 | 12/2003 |
| JP | 60-076051 | 4/1985 |

(Continued)

OTHER PUBLICATIONS

International Search Report- PCT/JP2008/067055—Oct. 28, 2008.

(Continued)

*Primary Examiner* — Korie H Chan
(74) *Attorney, Agent, or Firm* — Young & Thompson (57) ABSTRACT

The deep cell (300) of the present invention is capable of accommodating two data cartridges (100) in a row. In addition, the deep cell (300) includes a regulating member (301) for regulating the storage of two data cartridges (100) and for regulating storage to just one data cartridge (100).

5 Claims, 10 Drawing Sheets

(56) References Cited

U.S. PATENT DOCUMENTS

| | | | |
|---|---|---|---|
| 7,782,565 B2 * | 8/2010 | Starr | 360/92.1 |
| 2003/0227708 A1 | 12/2003 | Luffel | |
| 2010/0254039 A1 * | 10/2010 | Kawasaki et al. | 360/92.1 |

FOREIGN PATENT DOCUMENTS

| | | |
|---|---|---|
| JP | 61-14584 | 4/1986 |
| JP | 62-134852 | 6/1987 |
| JP | 64-046253 | 2/1989 |
| JP | 03-063963 | 3/1991 |
| JP | 91-10594 | 7/1991 |
| JP | 04-078057 | 3/1992 |
| JP | 05-120776 | 5/1993 |
| JP | 05-128681 | 5/1993 |
| JP | 06-139678 | 5/1994 |
| JP | 6-309751 | 11/1994 |
| JP | 7-134854 | 5/1995 |
| JP | 7-505850 | 6/1995 |
| JP | 2001-184768 | 7/2001 |
| JP | 2005-209278 | 8/2005 |

OTHER PUBLICATIONS

Extended European Search Report dated Sep. 14, 2012 issued by the European Patent Office in counterpart European Patent Application No. 08833370.3, 7 pages.

Japanese Official Action—2009-534312—Apr. 11, 2013.

Japanese Office Action dated Feb. 4, 2014 in corresponding Japanese Patent Application No. 2009-534312 with English translation of enclosed wavy lined portions of Japanese Office Action.

* cited by examiner

STORAGE CELL AND MAGAZINE

TECHNICAL FIELD

The present invention relates to a storage cell for storing a plurality of data cartridges such as magnetic tapes, magnetic disks, optical disks, or magneto-optical disks in a row and to a magazine for storing the storage cells.

BACKGROUND ART

As disclosed by JP-A-2005-209278, a library device (in some cases also referred to as, for example, a data storage system) is known in which data cartridges are housed in a plurality of cells of a magazine, a desired data cartridge is selectively picked out from the plurality of data cartridges, and reading or writing of data is then carried out by means of a drive device.

Figure 1A:
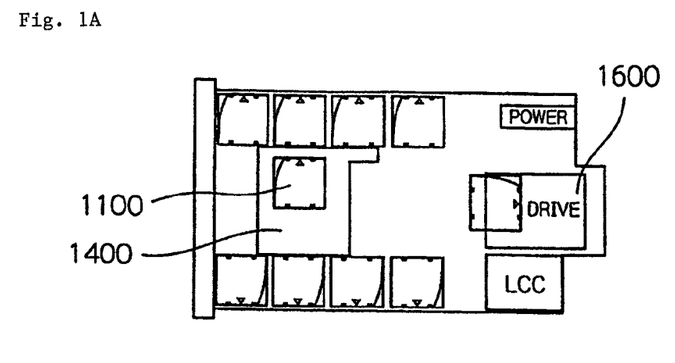
FIG. 1A is a plan view of a library device that is relevant to the present invention.
Figure 1B:
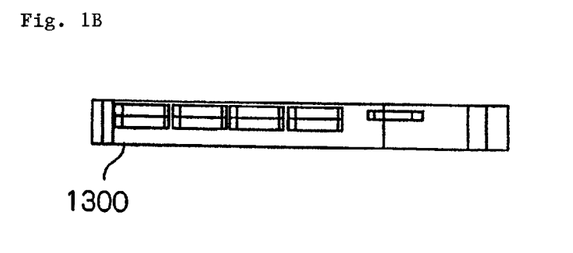
FIG. 1B is a front view of a library device that is relevant to the present invention.
Figure 2:
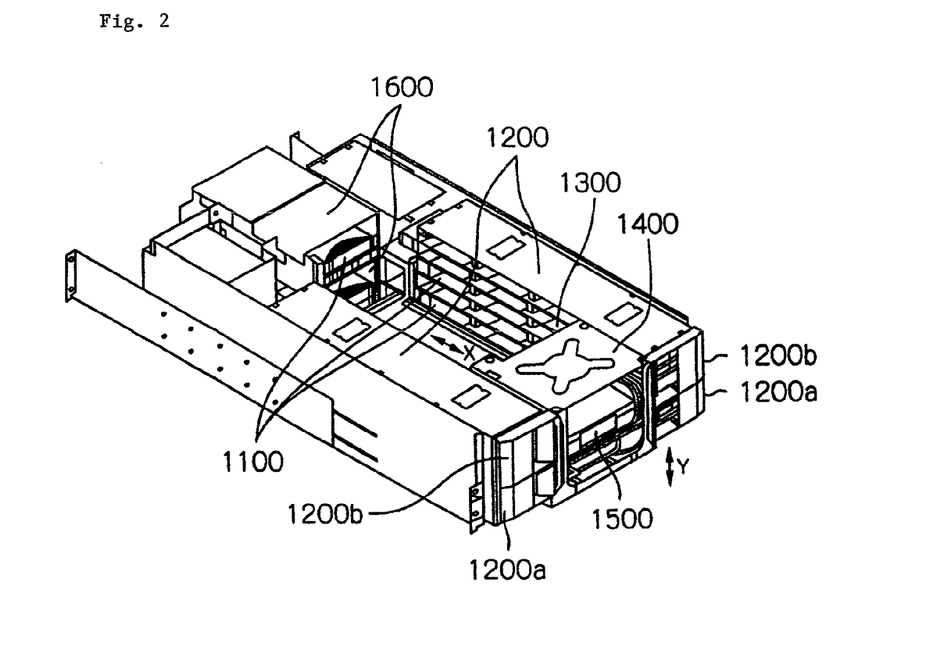
FIG. 2 is an outer perspective view of an example of a library device that is relevant to the present invention.

FIG. 1A is a plan view of a library device that is relevant to the present invention. FIG. 1B is a front view of a library device that is relevant to the present invention. FIG. 2 is an outer perspective view of an example of a library device that is relevant to the present invention.

The library device shown in FIGS. 1A, 1B, and 2 and that is relevant to the present invention includes: magazines 1200 that have a plurality of cells 1300 that accommodate data cartridges 1100 in a stacked state and in a horizontal state; two drive devices 1600 for reading data from and writing data to the recording medium in data cartridges 1100; and accessor mechanism 1400 for transporting data cartridges 1100.

In this library device, two magazines 1200 are oppositely arranged such that the openings of cells 1300 confront each other. This library device is further configured such that two drive devices 1600 stacked one over the other are disposed close to one end of these magazines 1200. These two magazines 1200 and drive devices 1600 are arranged to make a substantially U-shaped form. The open directions of the openings of cells 1300 of two magazines 1200 face in directions that are orthogonal to the X direction, and further, are directed to confront each other. The opening direction of drive device 1600 is the X direction that differs from both of the opening directions of two magazines 1200.

In this way, the opening directions of each of cells 1300 inside two magazines 1200 and drive devices 1600 are all different. As a result, a swivel mechanism for rotating the picker mechanism is provided on accessor mechanism 1400 for transferring data cartridges 1100 between each cell 1300 and drive device 1600.

However, in the library device shown in FIGS. 1A, 1B, and 2, magazines 1200 are arranged on both sides of accessor mechanism 1400. In addition, the necessity of a swivel mechanism for rotating the picker mechanism on accessor mechanism 1400 results in a large accessor mechanism 1400. As a result, the library device requires a large installation space. In addition, the complex configuration of accessor mechanism 1400 results in increased costs.

In response, the adoption of a cell of the so-called storage cell type and a modification of the layout of the magazines and drive devices can be considered. A storage cell is a cell having a form that allows a plurality of data cartridges to be accommodated within a single cell. The storage cell is hereinafter referred to as a deep cell. As the layout of the library device, a layout can be considered in which a drive device is placed in alignment with a magazine that accommodates deep cells, and the opening direction of the deep cells is matched to the opening direction of the drive device. This layout allows consolidation to a single magazine and, because the accessor mechanism no longer requires a swivel mechanism, allows a reduction of the installation space of the library device.

The method of inserting and removing a data cartridge in a library device that uses deep cell is next described using FIGS. 3A-3F.

In the library device shown in FIGS. 3A-3F, magazine 2200 is arranged adjacent to drive device 2600. In addition, openings 2305 of deep cells 2300 housed in magazine 2200 and the opening direction of opening 2605 of drive device 2600 are the same direction. Five deep cells 2300 are juxtaposed in magazine 2200, each deep cell 2300 being capable of accommodating two data cartridges in a row. As a result, magazine 2200 is capable of holding a maximum of ten data cartridges. However, because at least one empty area must be provided in magazine 2200 to use magazine 2200 in the library device, a maximum of only nine data cartridges can be accommodated. The reason for this limitation is next explained together with the method of inserting and removing data cartridges.

Figure 3A:
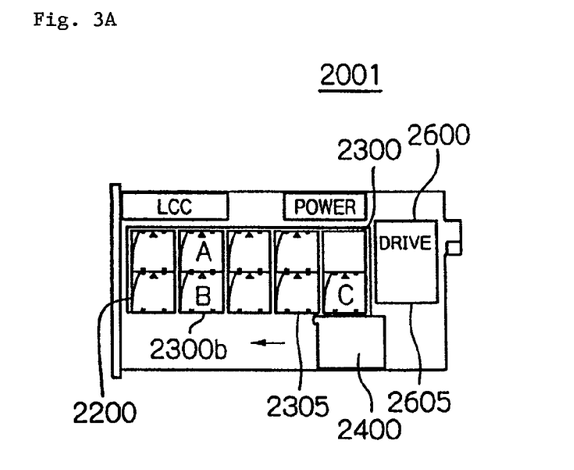
FIG. 3A is a view for explaining the method of inserting and removing data cartridge A in a library device that uses a deep cell that is relevant to the present invention.

Here, as shown in FIG. 3A, an example is described in which data cartridge A that is stored at the back of deep cell 2300 is to be conveyed to drive device 2600.

Figure 3B:
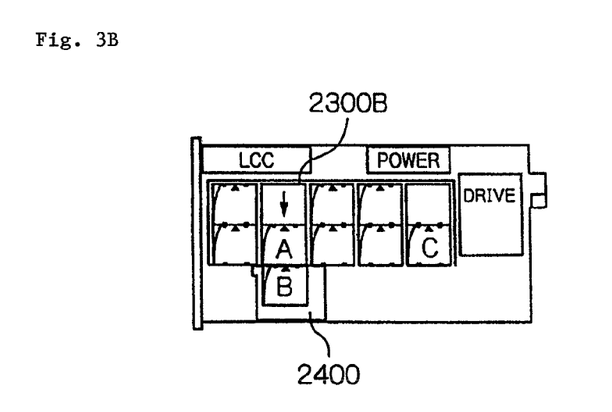
FIG. 3B is a view for explaining the method of inserting and removing data cartridge A in the library device that uses a deep cell, that is relevant to the present invention, and shows the state in which data cartridge B is removed.

As shown in FIG. 3B, accessor mechanism 2400 is moved in front of deep cell 2300$b$ that accommodates data cartridge A. Here, deep cell 2300$b$ accommodates the two data cartridges: data cartridge A and data cartridge B, data cartridge A being accommodated rearward from data cartridge B. Data cartridge B therefore constitutes an obstacle and data cartridge A cannot be directly accessed. In response, data cartridge B must first be ejected from deep cell 2300B to achieve a state in which data cartridge A can be accessed, following which data cartridge A can be extracted.

As shown in FIG. 3B, accessor mechanism 2400 first removes data cartridge B. Removing data cartridge B results in data cartridge A moving forward by means of an biasing means (not shown in the figure).

Figure 3C:
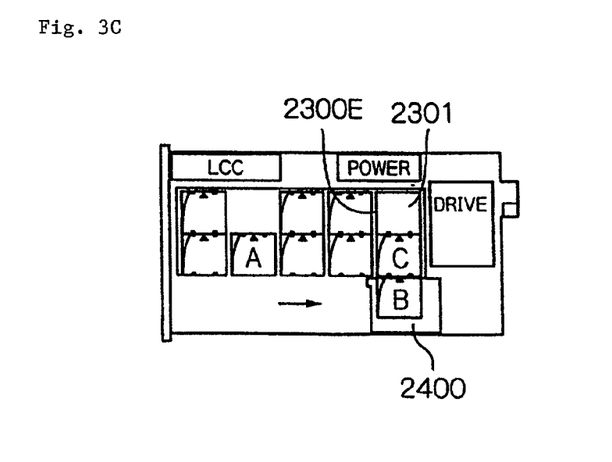
FIG. 3C is a view for explaining the method of inserting and removing data cartridge A in the library device that uses a deep cell, that is relevant to the present invention, and shows the state in which data cartridge B is moved in front of a deep cell that has an empty area.

Next, as shown in FIG. 3C, loaded with data cartridge B, accessor mechanism 2400 moves to the front of deep cell 2300E. This deep cell 2300E accommodates only one data cartridge C, and therefore has empty area 2301.

Figure 3D:
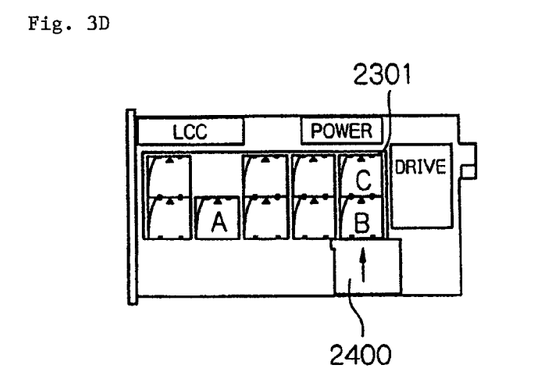
FIG. 3D is a view for explaining the method of inserting and removing data cartridge A in a library device that uses a deep cell, that is relevant to the present invention, and shows the state in which data cartridge C moves to an empty area by storing data cartridge B in a deep cell.

Next, as shown in FIG. 3D, accessor mechanism 2400 stores data cartridge B in deep cell 2300E. When data cartridge C is pushed by data cartridge B that is being inserted, data cartridge C moves to the position of empty area 2301.

Figure 3E:
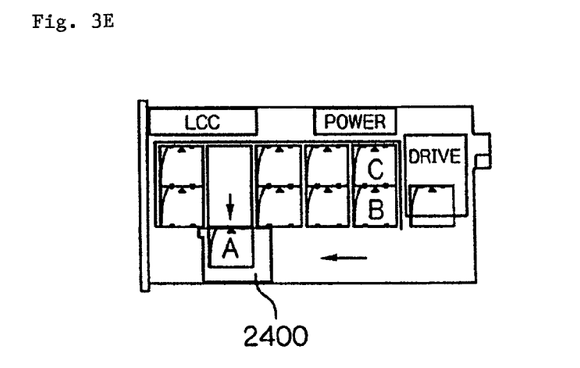
FIG. 3E is a view for explaining the method of inserting and removing data cartridge A in a library device that uses a deep cell, that is relevant to the present invention, and shows the state in which data cartridge A is removed.

Next, as shown in FIG. 3E, accessor mechanism 2400 is again moved in front of deep cell 2300B. Because data cartridge A has moved forward, accessor mechanism 2400 is able to remove data cartridge A from inside deep cell 2300B.

Figure 3F:
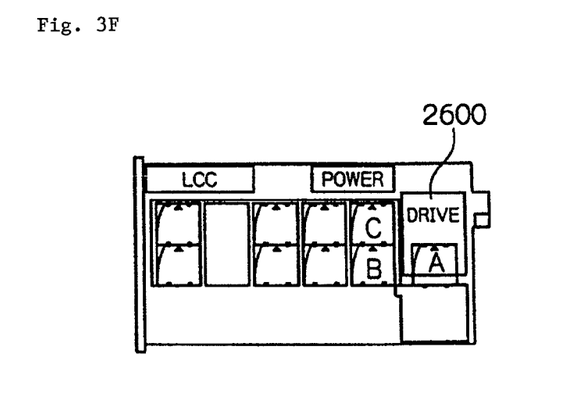
FIG. 3F is a view for explaining the method of inserting and removing data cartridge A in a library device that uses a deep cell, that is relevant to the present invention, and shows the state in which data cartridge A is inserted into a drive device to complete the movement operation.

Finally, loaded with data cartridge A, accessor mechanism 2400 moves in front of drive device 2600 and inserts data cartridge A into drive device 2600 to complete the operation.

DISCLOSURE OF THE INVENTION

As described hereinabove, when using a library device that uses a magazine that accommodates deep cells, accessing a data cartridge that is stored in the back of a deep cell first requires an empty area for temporarily evacuating the data cartridge that is stored in front of the data cartridge that is to be accessed.

However, because deep cells are all capable of accommodating a plurality of data cartridges, the user may in some cases store the maximum number of data cartridges that can be accommodated in the magazine without recognizing the above-described situation. Alternatively, it is possible that the user may store the maximum number of data cartridges that can be stored in the magazine by mistake even though aware that an empty space is needed.

It is an object of the present invention to provide a storage cell and magazine that can prevent storage of the maximum number of data cartridges that can be accommodated.

To achieve the above-described object, the storage cell of the present invention is capable of storing a plurality of data cartridges in a row and includes a regulating means for regulating the storage of the maximum number of data cartridges that can be stored.

The magazine of the present invention is capable of accommodating a plurality of storage cells that store a plurality of data cartridges in a row and accommodates at least one storage cell of the present invention.

According to the storage cell of the present invention, storage of the maximum number of data cartridges that can be stored can be prevented.

BEST MODE FOR CARRYING OUT THE INVENTION

Exemplary embodiments of the present invention are next described while referring to the accompanying drawings.

A storage cell that is a cell of a type that can accommodate a plurality of data cartridges in one cell is referred to as a "deep cell" in the following explanation.

Figure 4A:
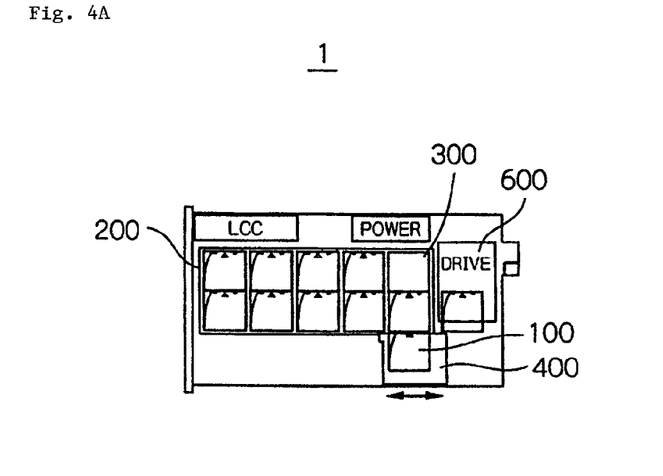
FIG. 4A is a plan view of an exemplary embodiment of the library device of the present invention.
Figure 4B:
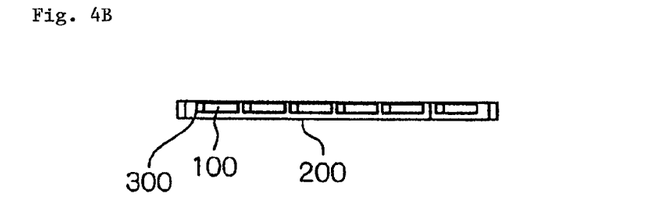
FIG. 4B is a front view of an exemplary embodiment of the library device of the present invention.
Figure 5:
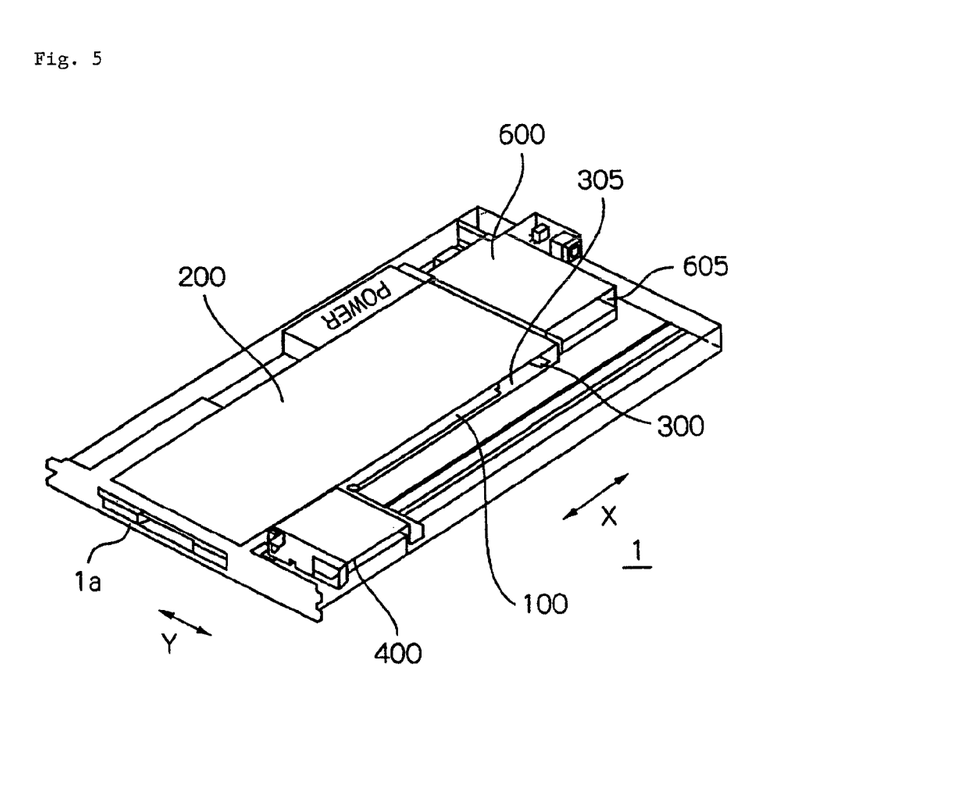
FIG. 5 is an outer perspective view of an exemplary embodiment of the library device of the present invention.
Figure 6:
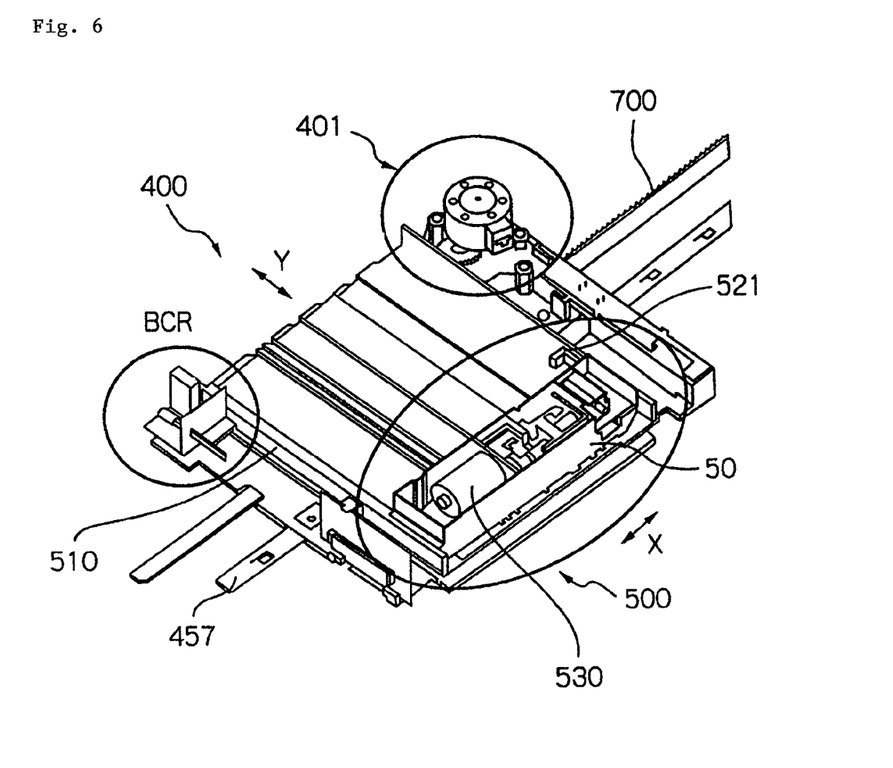
FIG. 6 is a perspective view showing the configuration of the accessor mechanism.
Figure 7A:
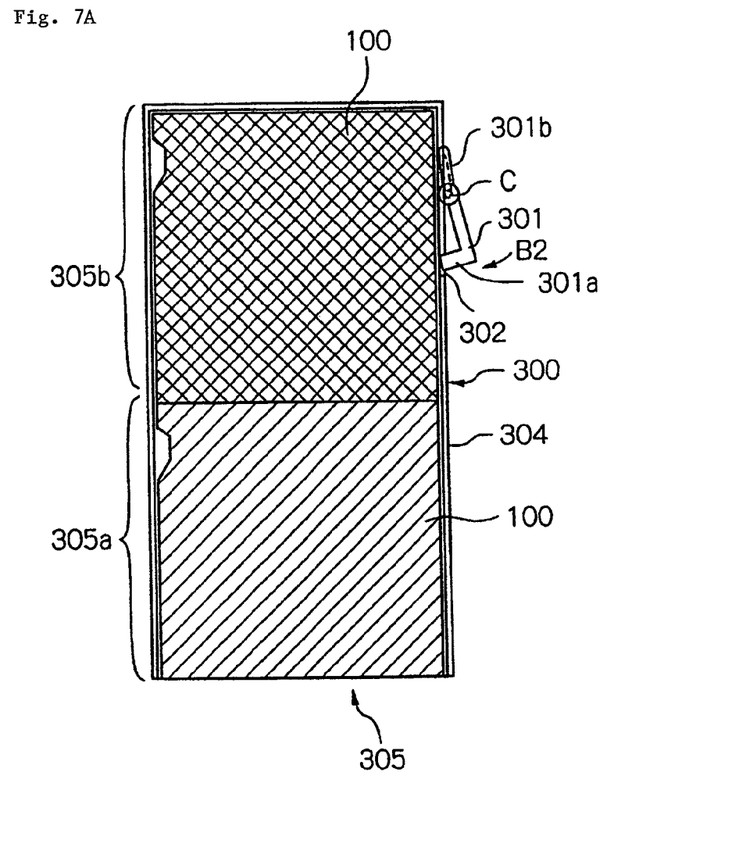
FIG. 7A is a schematic plan view for describing the construction of an exemplary embodiment of the deep cell of the present invention and shows the state in which the contact part of a regulating member is located outside a deep cell.
Figure 7B:
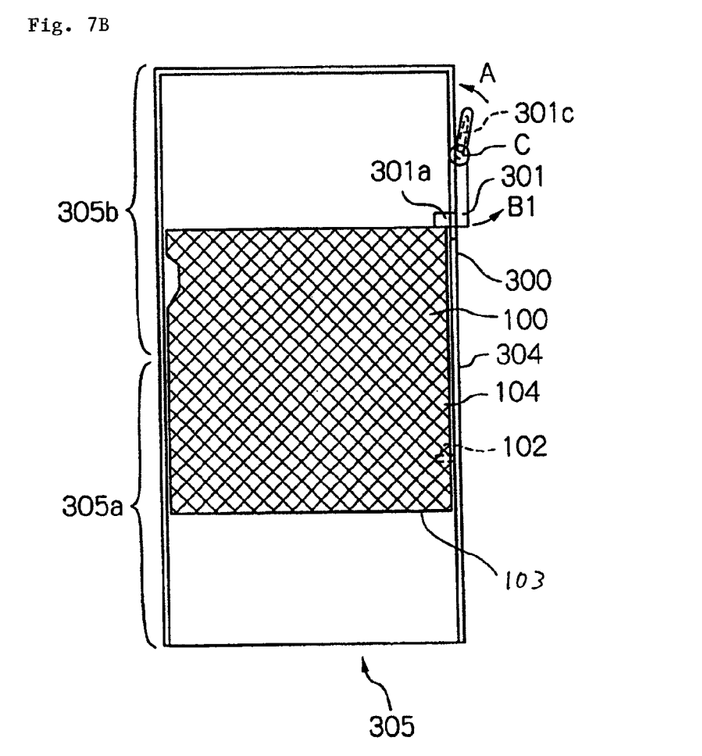
FIG. 7B is a schematic plan view for describing the construction of an exemplary embodiment of the deep cell of the present invention and shows the state in which the contact part of the regulating member is located inside a deep cell.
Figure 8A:
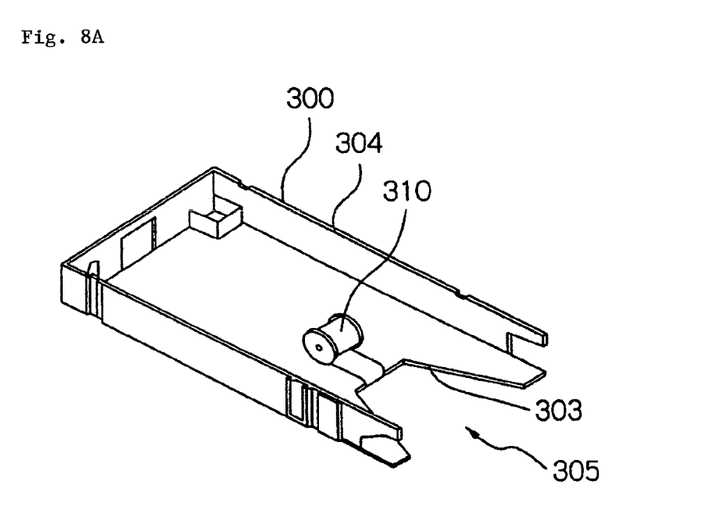
FIG. 8A is a perspective view for describing the basic construction of a deep cell in a state in which a data cartridge is not accommodated in the deep cell.
Figure 8B:
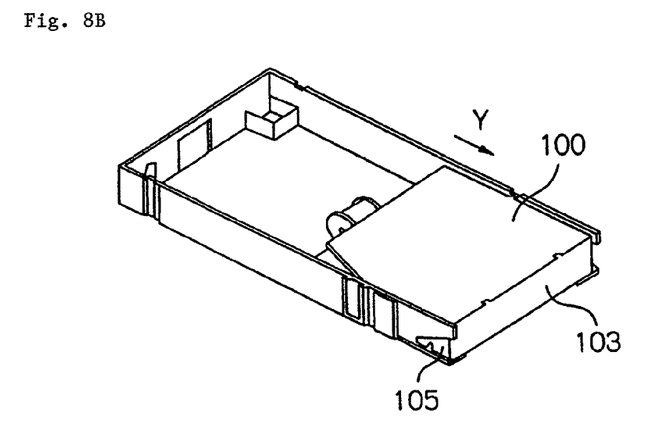
FIG. 8B is a perspective view for describing the basic construction of a deep cell in a state in which one data cartridge is accommodated in the deep cell.
Figure 8C:
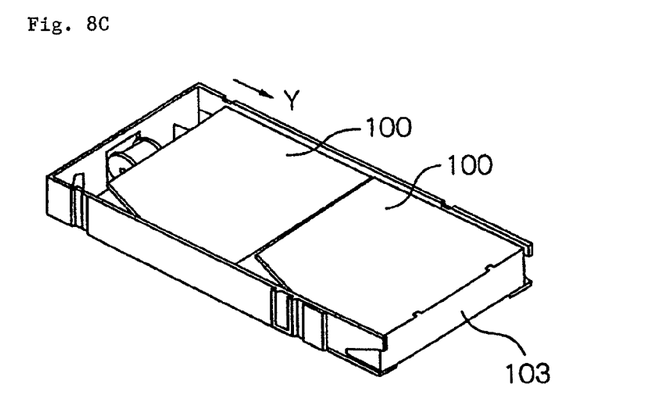
FIG. 8C is a perspective view for explaining the basic construction of a deep cell in a state in which two data cartridges are accommodated in the deep cell.
Figure 9:
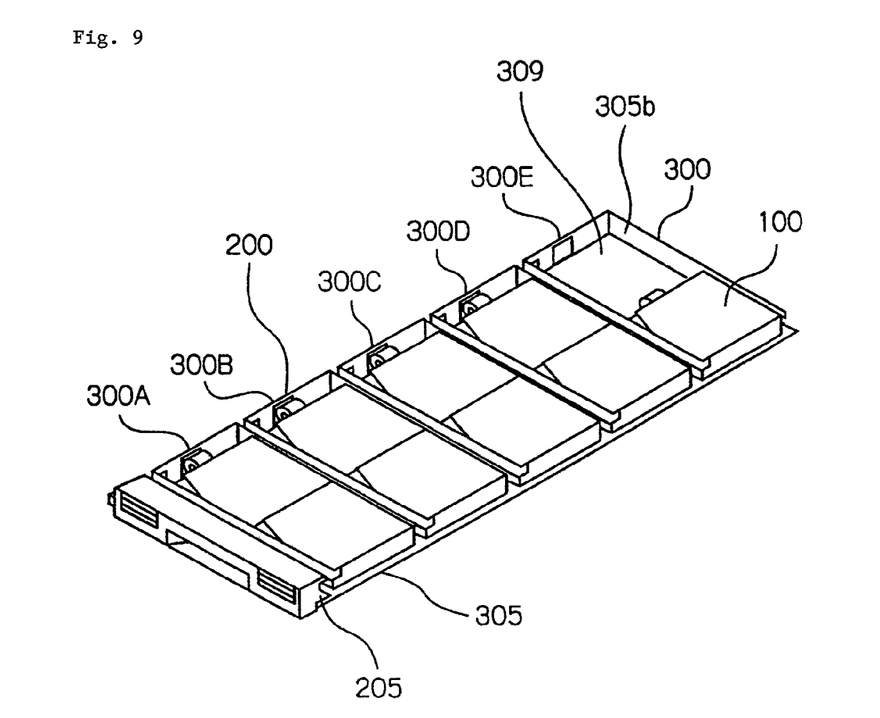
FIG. 9 is a see-through perspective view of an exemplary embodiment of the magazine of the present invention.

FIG. 4A is a plan view of the library device of the exemplary embodiment. FIG. 4B is a front view of the library device of the exemplary embodiment. FIG. 5 is an outer perspective view of the library device of the exemplary embodiment. FIG. 6 is a perspective view showing the configuration of the accessor mechanism. FIGS. 7A and 7B are schematic plan views for explaining the configuration of the deep cell of the exemplary embodiment. FIGS. 8A-8C are perspective views for explaining the basic configuration of a deep cell. In addition, FIG. 9 is a see-through perspective view of a magazine. FIGS. 8A-8C are for explaining the basic configuration of a deep cell, and the regulating member shown in FIG. 9 is therefore omitted.

The library device of the exemplary embodiment includes magazine 200, drive device 600, and accessor mechanism 400. Magazine 200 includes deep cells 300 for storing a plurality of data cartridges 100 in a row. Drive device 600 carries out reading of data from and writing of data to the recording medium in data cartridges 100. Accessor mechanism 400 transports data cartridges 100.

In the exemplary embodiment, one magazine 200 and drive device 600 are arranged adjacent to each other. In addition, the opening directions of openings 305 of deep cells 300 that are accommodated in magazine 200 and opening 605 of drive device 600 are aligned in the same direction.

(Accessor Mechanism)

Accessor mechanism 400 is of a configuration that can be moved back and forth by drive unit 401, and in addition, is equipped with picker frame 510. Picker mechanism 500 is mounted in this picker frame 510 such that picker mechanism 500 can move in the Y direction.

Drive unit 401 is composed of a motor and a drive gear train, the final gear of this drive gear train engaging with rack 700 that extends in the X direction. When the motor of drive unit 401 is rotation-driven in the forward or reverse directions, accessor mechanism 400 moves back and forth in the X direction in the figure along guide rail 457 under this drive power. In addition, the mechanism for movement in the X direction of accessor mechanism 400 may be made up from a combination of a known timing belt and pulley as long as accurate positioning is possible.

In the exemplary embodiment, accessor mechanism 400 is described as a component that moves only in a horizontal direction, but when magazines 200 are stacked in multiple layers, a construction capable of moving in the vertical direction is provided.

(Picker Mechanism)

Picker mechanism 500 carries out operations for holding data cartridge 100 and inserting data cartridge 100 into and removing data cartridge 100 from deep cells 300 of magazine 200 and drive device 600. By means of these operations, accessor mechanism 400 that is equipped with picker mechanism 500 is capable of conveying data cartridges 100 between deep cells 300 and drive device 600, between each deep cell 300, or between each drive device 600.

Picker mechanism 500 includes picker main body 501 that accommodates picker drive motor 530. This picker main unit 501 is provided with a picker arm 521 for withdrawing data cartridge 100 from within deep cells 300.

(Deep Cell)

As shown in FIG. 7A, deep cell 300 is capable of accommodating two data cartridges 100 in a row in the longitudinal direction. Opening 305, into which data cartridges 100 are inserted and from which data cartridges 100 are removed, is formed on one end of deep cell 300, deep cell 300 including front storage area 305a and rear storage area 305b in the order from the side of opening 305, therein. In other words, deep cell 300 stores one data cartridge 100 in each of front storage area 305a and rear storage area 305b and can accommodate a maximum of two data cartridges 100.

Using FIGS. 7A and 7B, explanation here regards regulating member 301, which is the characteristic part of deep cell 300 of the exemplary embodiment.

Both regulating member 301 and hole 302 are provided and formed at positions on side surface 304 of deep cell 300 that correspond to rear storage area 305b. Regulating member 301 includes contact part 301a, lever 301b that is a retracting means, and spring member 301c that is a biasing means.

The main body of regulating member 301 is arranged outside deep cell 300. In addition, regulating member 301 is provided to allow rotation around rotation center C. Contact part 301a is provided on one end of regulating member 301, and lever 301b is provided on the other end with rotation center C interposed.

As shown in FIG. 7B, regulating member 301 normally, by being biased by spring member 301c, causes contact part 301a to protrude from hole 302 formed in side surface 304 of deep cell 300, into rear storage area 305b inside deep cell 300. By pushing lever 301b in the direction of arrow A against the biasing force resulting from spring member 301c, regulating member 301 rotates around rotation center C and contact part 301a moves in the direction of arrow $B_1$. By pushing lever 301b until lever 301b strikes against side surface 304, contact part 301a can be caused to retract from rear storage area 305b to outside deep cell 300, as shown in FIG. 7A. When the pressure against lever 301b is released, regulating member 301 again rotates in the direction of $B_2$ around rotation center C under the biasing force of spring member 301c, whereby contact part 301a protrudes into deep cell 300 from hole 302, as shown in FIG. 7B.

In the state in which contact part 301a is retracted outside deep cell 300, deep cell 300 can store data cartridge 100 in both of front storage area 305a and rear storage area 305b, as shown in FIG. 7A.

On the other hand, in a state in which contact part 301a protrudes inside deep cell 300, contact part 301a becomes an obstacle and data cartridge 100 cannot be accommodated in rear storage area 305b, as shown in FIG. 7B. As a result, deep cell 300 in this case can accommodate data cartridge 100 in only front storage area 305a. In other words, deep cell 300 in a state in which lever 301b is not pushed can prevent the user from mistakenly storing two data cartridges 100 and can thus reliably keep rear storage area an empty area.

Although a configuration was shown in the exemplary embodiment in which regulating member 301 was provided on side surface 304 of deep cell 300, regulating member 301 may also be provided on bottom surface 303. In this case, hole 302 is formed in bottom surface 303 such that contact part 301a can protrude.

Although regulating member 301 having contact part 301a that protrudes into deep cell 300 was taken as an example in the exemplary embodiment, the configuration of the deep cell for reliably providing an empty area is not limited to this form. As a result, any configuration is possible that can make the user aware that data cartridge 100 cannot be stored in rear storage area 305b, but a mechanical configuration is preferable.

A system can be considered in which a sensor is provided for detecting that data cartridge 100 is inserted into rear storage area 305b, and based on a signal from this sensor, the user is warned by sound or a light that data cartridge 100 is being mistakenly inserted into rear storage area 305b, but such a system cannot be considered suitable. If the user does not notice or ignores an alert by sound or a light, an empty space cannot be reliably provided. As a result, a combination of the sensor and a mechanical construction is preferable by which, when mistaken insertion is detected by a sensor, the regulating member is caused to protrude into deep cell 300, whereby the regulating member obstructs data cartridge 100 and prevents further insertion.

Deep cell 300 of the exemplary embodiment is a configuration capable of storing a maximum of two data cartridges 100, but the deep cell of the present invention is not limited to this form. In other words, the deep cell of the present invention may be a configuration capable of storing three or more data cartridges in a row.

In the case of, for example, a deep cell capable of storing three or more data cartridges, the regulation realized by the regulating member can be set to enable storage of only one data cartridge and prevent storage of two or more data cartridges. For example, in a deep cell that stores three data cartridges, when a picker mechanism is to access the rearmost data cartridge, the two front data cartridges must be first evacuated. Empty areas for two data cartridges are necessary for temporarily storing these two front data cartridges that are to be evacuated. As a result, when these two empty areas are to be provided in one deep cell, the regulating member must limit storage to only one data cartridge. As a result, in the case of a deep cell capable of storing three data cartridges, a configuration that prevents the storage of two data cartridges is preferable.

Naturally, if empty areas for two data cartridges are provided by simultaneously using two deep cells, one data cartridge may be evacuated to each deep cell. Thus, in the case of adopting this method of use, where the deep cell can store a maximum of three data cartridges, the regulating member should allow storage of only two data cartridges.

Although a configuration has been described in which contact part 301a protrudes into rear storage area 305b in the exemplary embodiment, the present invention is not limited to this form, and a configuration is also possible in which contact part 301a protrudes into the front storage area 305a side. In this case, when data cartridge 100 is to be stored in rear storage area 305b, pressing upon lever 301b causes retraction of contact part 301a. Then, after data cartridge 100 has been accommodated in rear storage area 305b, pressure upon lever 301b is released and contact part 301a is caused to protrude into front storage area 305a. In this way, even when storage of another data cartridge 100 in front storage area 305a is attempted, contact part 301a serves as an obstacle and can prevent storage of two data cartridges 100. In the case of this configuration, a means for holding data cartridge 100 in rear storage area 305b must be provided in deep cell 300. Alternatively, a means is preferably provided in magazine 200 such that, by accommodating deep cells 300 in magazine 200, lever 301b is pressed and contact part 301a is automatically retracted. This configuration is for enabling the evacuation to front storage area 305a of a data cartridge that is to be temporarily evacuated.

Another basic configuration of deep cell 300 is next described using FIGS. 8A-8C.

As shown in FIG. 8A, deep cell 300 includes constant-force spring 310 on bottom surface 303 for biasing data cartridge 100 toward the opening 305 side.

Constant-force spring 310 is a spring constituted by a thin plate tightly wound at a fixed curvature, is used with its outer end linearly extending, and has a characteristic by which its load remains substantially uniform regardless of the stroke. Substantially the same load is applied to data cartridge 100 both when one data cartridge 100 is accommodated within deep cell 300 as shown in FIG. 8B and when two data cartridges 100 are accommodated as shown in FIG. 8C. In addition, the means for biasing data cartridge 100 toward the opening 305 side is not limited to constant-force spring 310 and may be, for example, an ordinary coil spring.

(Magazine)

Magazine 200 is a housing container that houses a plurality of deep cells 300 and that can deal with this plurality of deep cells 300 as an assembly. Deep cells 300 are accommodated in parallel in magazine 200, five deep cells 300A-300E being accommodated in the example shown in FIG. 9. Regarding deep cells 300 that are accommodated in magazine 200, opening 205 of magazine 200 and openings 305 of deep cells 300 open in the same direction.

In the example shown in FIG. 9, deep cell 300E that is located farthest away of the five deep cells 300 accommodates only one data cartridge 100, and rear storage area 305b of deep cell 300E is empty area 309.

Figure 10A:
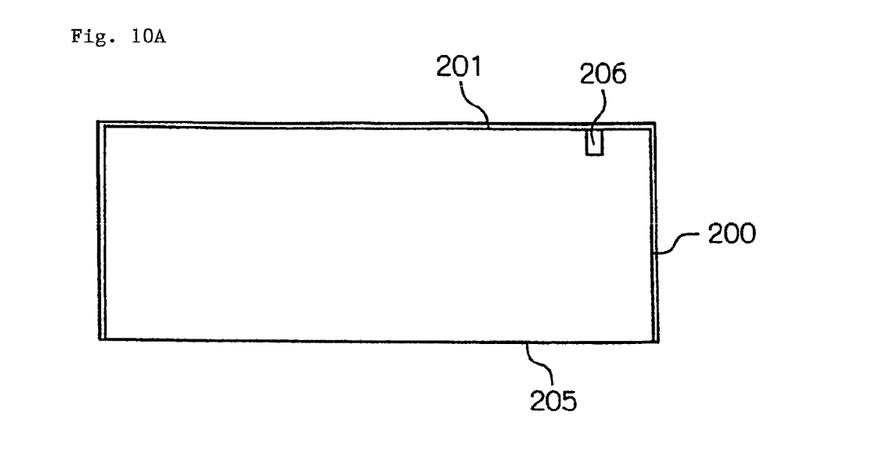
FIG. 10A is a see-through plan view of another exemplary embodiment of the magazine of the present invention that has a protruding member inside.
Figure 10B:
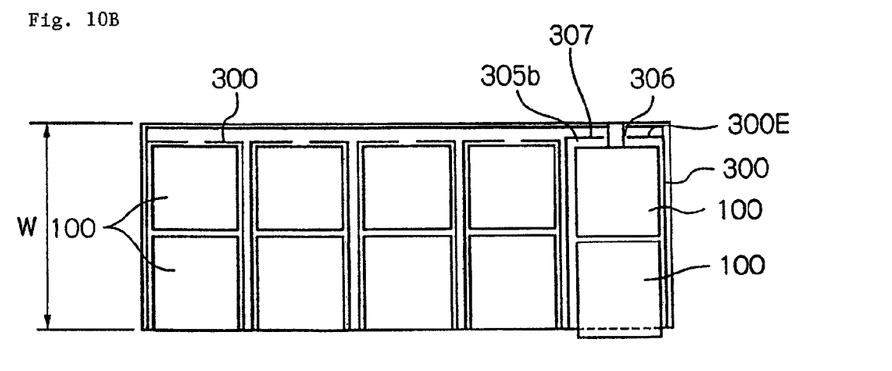
FIG. 10B is a see-through plan view showing a state in which a deep cell is accommodated in the magazine of the present invention shown in FIG. 10A.

In the foregoing explanation, an example was described in which regulating member 301 is provided in deep cell 300 to provide empty area 309. However, rather than providing the above-described configuration in a deep cell, a component that serves the same function as the regulating member may be provided on the magazine 200 side. FIG. 10 shows an example of a magazine equipped with this type of function.

The magazine shown in FIG. 10A includes protruding component 206 that protrudes into magazine on rear surface 201 that is the surface opposite opening 205.

On the other hand, hole 306 into which protruding component 206 can advance is formed on rear surface 307 of deep cell 300 as shown in FIG. 10B. In other words, when deep cell 300 is set at the location at which protruding component 206 is provided, protruding component 206 advances into deep cell 300.

Next, it is assumed that two data cartridges 100 are mistakenly inserted in deep cell 300E even though an empty area should be provided in rear storage area 305b of deep cell 300E. If deep cell 300E is set in this state, data cartridge 100 is pushed out by the entrance of protruding member 206 into deep cell 300E and, because data cartridge 100 cannot be properly accommodated in magazine 200, a portion of data cartridge 100 juts out. In this state, even if the insertion of magazine 200 into insertion port 1a of library device 1 (see FIG. 5) is attempted, the opening width of insertion port 1a is only slightly greater than the width W of magazine 200, and insertion is therefore not possible due to the hindrance of data cartridge 100 that juts out. The user thus realizes that two data cartridges 100 have been mistakenly inserted into deep cell 300E. The user then removes one data cartridge 100 from deep cell 300E and is thus able to insert magazine 200 into insertion port 1a of library device 1.

In this way, an empty area can be reliably provided even in the case of a configuration provided with a mechanical component such as the protruding member on the magazine 200 side.

(Data Cartridge)

Data cartridge 100 is a recording medium to which computers (not shown), that are connected to the library device by way of a communication line such as a LAN (Local Area Network) or the Internet read and write shared data. Examples of this recording medium include tape media such as LTO and DLT, and disk media such as DVDs, magneto-optical disks (MO) or MDs that are accommodated in housings.

As shown in FIG. 7B, in data cartridge 100 of the exemplary embodiment, engagement hole 102 is formed close to rear surface 103 of first side surface 104. Engagement hole 102 is a hole for engaging with picker arm 521.

(Drive Device)

Drive device 600 is a read/write device that reads data that have been written to data cartridge 100 that is loaded in drive device 600, and further, that writes data that have been updated by a computer operator to data cartridge 100.

According to deep cell 300 or magazine 200 of the exemplary embodiment, the storage of the maximum number of data cartridges 100 that can be stored can be prevented.

Although the invention of the present application has been described with reference to the exemplary embodiments, the invention of the present application is not limited to the above-described exemplary embodiments. The configuration and details of the invention of the present application are open to various modifications within the scope of the invention of the present application that will be understood by anyone of ordinary skill in the art.

This application is based upon and claims the benefit of priority from JP-A-2007-254051, filed on Sep. 28, 2008, the disclosure of which is incorporated herein in its entirety by reference.

The invention claimed is:

1. A storage cell that accommodates a plurality of data cartridges in a row, comprising:
   a housing defining an enclosed storage area that accommodates i) a first one of the data cartridges stored in a rear storage position adjacent a closed rear end of the housing and remote from an open end of the housing, and ii) a second one of the data cartridges stored in a front storage position adjacent the open end of the housing and remote from the closed rear end of the housing, the rear storage position and the front storage position defining a row,
   said housing having a side surface, the side surface extending from the open front end to the closed rear end of the housing and defining an edge of the rear storage position and a corresponding edge of the front storage position;
   a side surface hole located on the side surface; and
   a regulating member that regulates storage of a maximum number of the data cartridges that can be stored, the regulating member being located on the side surface, said regulating member comprising a protruding contact part connected to a lever, and a biasing element that biases the protruding contact part to protrude from the side surface hole into the rear storage position, the lever and the biasing element rotatable, wherein the first data cartridge is storable in the rear storage position by entry into the open end of the housing, movement through the front storage position, and movement past the side surface hole into the rear storage position, wherein the lever is biased by the biasing element so that the protruding contact part rotates to extend through said side surface hole and extend into the storage area to thereby form a blockage, wherein, with the protruding contact part extended through said side surface hole into the storage area to form said blockage, the protruding contact part blocks the movement of the second data cartridge past the side surface hole and rearwards to thereby prevent complete insertion of the second data cartridge to regulate the storage of the maximum number of the data cartridges that can be stored within the enclosed storage area defined by the housing.

2. The storage cell as set forth in claim 1, wherein, the side surface hole is located at a first position on the side surface along where the side surface defines the edge of the rear storage position, the side surface hole defines a division of the rear storage position into a front portion and a rear portion, the regulating member is located at a second position on the side surface along where the side surface defines the edge of the rear storage position, the lever and the biasing element are rotatable about a common rotation center, the first data cartridge is storable in the rear storage position by entry into the open end of the housing, movement through the front storage position, movement through the front portion of the rear storage position, and movement past the side surface hole into the rear portion of the rear storage position, the lever is biased by the biasing element so that the protruding contact part rotates about the rotation center to extend through said side surface hole and extend into the storage area within the rear storage position to thereby form said blockage at the division of the rear storage position into the front portion and the rear portion, and with the protruding contact part extended through said side surface hole into the storage area to form said blockage, the protruding contact part blocks the further movement of the first data cartridge past the side surface hole and into the rear portion of the rear storage position to thereby prevent complete insertion of the first data cartridge into the rear storage position to regulate the storage of the maximum number of the data cartridges that can be stored within the enclosed storage area defined by the housing.

3. The storage cell as set forth in claim 1, wherein all of said maximum number of said data cartridges are stored when regulation by said regulating member is cancelled.

4. A magazine that is capable of storing a plurality of said storage cell as set forth in claim 1 in a side by side manner.

5. A storage cell that accommodates a plurality of data cartridges in a row, comprising:

a housing defining an enclosed storage area that accommodates i) a first one of the data cartridges configured to be stored in a rear storage position adjacent a closed rear end of the housing and remote from an open end of the housing, and ii) a second one of the data cartridges configured to be stored in a front storage position adjacent the open end of the housing and remote from the closed rear end of the housing, the first rear storage position and the second front storage position defining a row, said housing having a side surface, the side surface extending from the open front end to the closed rear end of the housing and defining an edge of the rear storage position and a corresponding edge of the front storage position;

a side surface hole located at a first position on the side surface along where the side surface defines the edge of the rear storage position, the side surface hole defining a division of the rear storage position into a front portion and a rear portion; and a regulating member that regulates storage of a maximum number of the data cartridges that can be stored, the regulating member being located at a second position on the side surface along where the side surface defines the edge of the rear storage position, said regulating member comprising a protruding contact part connected to a lever, and a biasing element that biases the protruding contact part to protrude from the side surface hole into the rear storage position, the lever and the biasing element rotatable about a common rotation center, wherein the first data cartridge is storable in the rear storage position by entry into the open end of the housing, movement through the front storage position, movement through the front portion of the rear storage position, and movement past the side surface hole into the rear portion of the rear storage position, wherein the lever is biased by the biasing element so that the protruding contact part rotates about the rotation center to extend through said side surface hole and extend into the storage area within the rear storage position to thereby form a blockage at the division of the rear storage position into the front portion and the rear portion, and wherein, with the protruding contact part extended through said side surface hole into the storage area to form said blockage, the protruding contact part capable of blocking the further movement of the first data cartridge past the side surface hole and into the rear portion of the rear storage position to thereby prevent complete insertion of the first data cartridge into the rear storage position to regulate the storage of the maximum number of the data cartridges that can be stored within the enclosed storage area defined by the housing.

* * * * *